US010084685B2

(12) United States Patent
Tomotaki et al.

(10) Patent No.: US 10,084,685 B2
(45) Date of Patent: Sep. 25, 2018

(54) ROUTE REFLECTOR AS A SERVICE

(71) Applicant: Verizon Patent and Licensing Inc., Arlington, VA (US)

(72) Inventors: Luis M. Tomotaki, Plano, TX (US); Gina L. Otts, Flower Mound, TX (US); William F. Copeland, Garland, TX (US); Matthew W. Turlington, Richardson, TX (US); Christopher N. DelRegno, Rowlett, TX (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 14/827,997

(22) Filed: Aug. 17, 2015

(65) Prior Publication Data

US 2017/0054628 A1 Feb. 23, 2017

(51) Int. Cl.
*G06F 15/173* (2006.01)
*H04L 12/721* (2013.01)
(Continued)

(52) U.S. Cl.
CPC .............. *H04L 45/06* (2013.01); *H04L 45/02* (2013.01); *H04L 63/0272* (2013.01); *H04L 65/1069* (2013.01); *H04L 45/04* (2013.01)

(58) Field of Classification Search
CPC ......... H04L 12/00; H04L 12/16; H04L 12/18; H04L 12/1863; H04L 12/1886; H04L 12/22; H04L 12/2854–12/287; H04L 12/2874; H04L 12/2876; H04L 12/2898; H04L 12/46; H04L 12/4604; H04L 12/462; H04L 12/4629; H04L 12/4641; (Continued)

(56) References Cited

U.S. PATENT DOCUMENTS 7,787,396 B1 * 8/2010 Nalawade ............... H04L 45/02
370/254
7,856,509 B1 * 12/2010 Kodeboyina ........... H04L 45/00
709/238

(Continued)

OTHER PUBLICATIONS

Cisco—MPLS VPN_Carrier Supporting Carrier—Dec. 11, 2002.*
(Continued)

*Primary Examiner* — Tauqir Hussain

(57) ABSTRACT

A computer device may include logic configured to generate a virtualized environment for a customer; receive a request to provide a route reflector service for the customer; and generate a virtual route reflector on the generated virtualized environment, in response to receiving the request to provide the route reflector service for the customer. The logic may further be configured to establish a Virtual Private Network (VPN) or secure tunnel connection between the generated virtual route reflector and a client router associated with a customer network via a cloud center access system, wherein the cloud center access system connects a cloud center system that includes the computer device to a provider network that includes the client router; and establish a Border Gateway Protocol (BGP) session between the client router and the generated virtual route reflector using the established VPN or secure tunnel connection.

20 Claims, 8 Drawing Sheets

(51) Int. Cl.
*H04L 29/06* (2006.01)
*H04L 12/751* (2013.01)
*H04L 12/715* (2013.01)

(58) Field of Classification Search
CPC ... H04L 29/00; H04L 29/06; H04L 29/06047;
H04L 29/06054; H04L 29/06095; H04L
29/06183; H04L 29/0619; H04L 29/0621;
H04L 29/06224–29/06265; H04L
29/06306–29/06326; H04L 29/06353;
H04L 29/06387; H04L 29/06523; H04L
29/06551; H04L 29/06612; H04L
29/06625; H04L 29/08–29/08036; H04L
29/08081; H04L 29/08099; H04L
29/08135; H04L 29/08144; H04L
29/08576; H04L 29/08585; H04L
29/08648; H04L 29/10; H04L 41/00;
H04L 41/04–41/046; H04L
41/08–41/0806; H04L 41/0813; H04L
41/0816; H04L 41/084; H04L 41/0846;
H04L 41/085; H04L 41/0853; H04L
41/0866–41/0876; H04L 41/0886; H04L
41/0893; H04L 41/12; H04L
45/00–45/025; H04L 45/04; H04L 45/16;
H04L 45/44; H04L 45/56; H04L 45/58;
H04L 45/586; H04L 45/60; H04L 49/00;
H04L 49/10; H04L 49/15; H04L 45/25;
H04L 45/70
USPC .................................................... 709/227
See application file for complete search history.

(56) References Cited

U.S. PATENT DOCUMENTS

| | | | | |
|---|---|---|---|---|
| 9,374,341 | B2* | 6/2016 | Doane | H04L 63/0272 |
| 9,621,429 | B2* | 4/2017 | Nuss | H04L 41/12 |
| 9,621,460 | B2* | 4/2017 | Mehta | H04L 45/74 |
| 9,722,874 | B2* | 8/2017 | Liljenstolpe | H04L 41/0893 |
| 2002/0184388 | A1* | 12/2002 | Yaseen | H04L 12/4641 |
| | | | | 709/242 |
| 2004/0034702 | A1* | 2/2004 | He | H04L 12/4633 |
| | | | | 709/224 |
| 2011/0149980 | A1* | 6/2011 | Patel | H04L 12/4641 |
| | | | | 370/401 |
| 2013/0031271 | A1* | 1/2013 | Bosch | H04W 40/36 |
| | | | | 709/245 |
| 2013/0155845 | A1* | 6/2013 | Patel | H04L 45/04 |
| | | | | 370/225 |
| 2016/0191325 | A1* | 6/2016 | Pacella | H04L 41/12 |
| | | | | 370/254 |

OTHER PUBLICATIONS

Cisco—MPLS VPNInter-AS_IPv4 BGP Label Distribution—Dec. 11, 2002.*
Ken Felix Security Blog_ PART1_ VRR Junos for BGP route reflectors—Jun. 2, 2015.*
RFC 4456—BGP Route Reflection_ An Alternative to Full Mesh Internal BGP—Apr. 2006—Bates.*
RFC 4761—VPLS Using BGP for Auto-Discovery and Signaling—Jan. 2007.*

* cited by examiner

ROUTE REFLECTOR AS A SERVICE

BACKGROUND INFORMATION

A communication network within the Internet may be defined as an autonomous system (AS). An AS may be a collection of devices with Internet Protocol (IP) routing prefixes that have a defined routing policy to the Internet. For example, a large company, an organization, an Internet Service Provider (ISP), and/or a provider of communication services that includes an Internet backbone connection may each manage a different AS. Thus, packets exchanged between a customer device, using an ISP to connect to a web site on a company's server device, and the server device may traverse a first AS associated with the ISP, a second AS associated with an Internet backbone connection, and a third AS associated with the company's private network. Routing and reachability information between different autonomous systems may be exchanged using Border Gateway Protocol (BGP) and devices configured with BGP may be referred to as BGP routers. Managing an AS with a large number of BGP routers may be challenging.

DETAILED DESCRIPTION OF PREFERRED EMBODIMENTS

Figure 1:
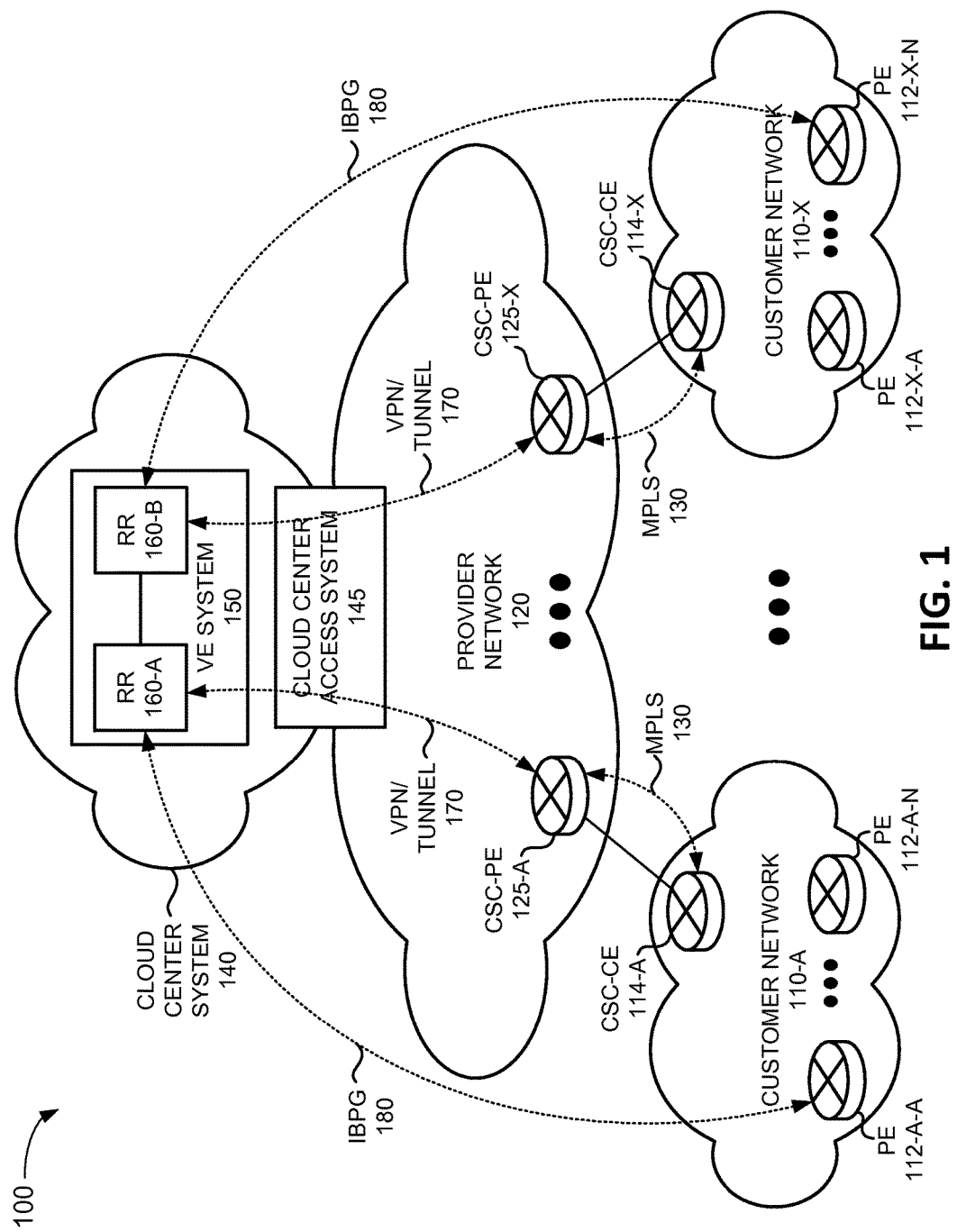
FIG. 1 is a diagram illustrating an exemplary environment according to an implementation described herein.

The following detailed description refers to the accompanying drawings. The same reference numbers in different drawings identify the same or similar elements.

A first AS and a second AS may exchange routing and/or reachability information using external BGP (EBGP). In order for a third AS to receive routing and/or reachability information about the first AS via the second AS, the routing and/or reachability information may need to traverse the second AS. Routing and/or reachability information within an AS may be exchanged using internal BGP (IBGP). In order for any external routing information (e.g., how to reach a particular external AS) to be distributed to all other BGP routers within an AS, all BGP routers within the AS may need to have full-mesh connectivity. As the number of BGP routers in an AS increases to n, the number of IBGP sessions required for full mesh connectivity increases by n*(n−1)/2, resulting in a scaling problem.

The scaling problem may be alleviated by using route reflectors. A route reflector may be a BGP router configured to reflect routing information to a group of client BGP routers. Thus, when a BGP router receives a route advertisement from an external AS via EBGP, the BGP router may forward the route advertisement to a route reflector router via IBGP, and the route reflector router may forward the route advertisement to all its client routers via IBGP. As the ratio of route reflectors to client routers grows, the number of IBGP sessions that needs to be maintained in the AS drops significantly. As a network grows in size, the number of route reflectors itself may increase to a large number. For example, a large AS may include hundreds of route reflectors. Maintaining a large number of route reflectors may be expensive and may tax the resources of a network.

Implementations described herein relate to providing a route reflector as a service. A virtualized environment (VE) system in a cloud center may generate a virtualized environment for the customer. The virtualized environment may be configured to simulate router devices. The VE system may receive a request from a customer to provide a route reflector service for they customer and may generate a virtual route reflector on the generated virtualized environment, in response to receiving the request. The customer may designate which edge routers to the customer's networks should become client routers of the generated virtual route reflector. The VE system may then establishing a Virtual Private Network (VPN) or a secure tunnel connection between the generated virtual route reflector and each of the designated client routers via a cloud center access system that connects the cloud center to a provider network that includes the client routers. As an example, the virtual route reflector may join a VPN associated with the customer. As another example, the computer device may utilize a tunnel mechanism to establish a secure Generic Routing Encapsulation (GRE) tunnel, an Internet Protocol Security (IPsec) tunnel, and/or another type of secure tunnel between the generated virtual route reflector and each of the client routers. The VE system may then establish a BGP session between the generated virtual route reflector and each client router using the established VPN or secure tunnel connections. A "tunnel," as the term is used herein, is understood to include a tunnel mechanism (e.g., hardware and corresponding software configurations on the hardware, etc.) used to implement a particular type of tunnel.

Once a generated virtual route reflector is configured, the generated virtual route reflector may receive a BGP route advertisement from one of its client routers, may forward the BGP route advertisement to all its other client routers and may forward the BGP route advertisement to all other route reflectors associated with the customer. Thus, the BGP route advertisement may be distributed to all routers associated with the customer's networks.

The customer may add additional routers as client routers to the generated virtual route reflector. For example, the VE system may receive a request from the customer to add another router as a client router of the generated virtual route reflector, may establishing another VPN or secure tunnel connection between the generated virtual route reflector and the other client router via the cloud center access system, and may establish another BGP session between the other client router and the generated virtual route reflector using the established other VPN or secure tunnel connection.

The customer may also add additional route reflectors. For example, the VE system may receive a request from the customer to generate another virtual route reflector and may generate another virtual route reflector, in response to receiving the request. The VE system may then establish a VPN or secure tunnel connection between the new generated virtual route reflector and the routers designated as the client routers of the new generated virtual route reflector via the cloud center access system. Furthermore, the VE system may establish a BGP session between the client routers and the new generated virtual route reflector using the established other VPN or secure tunnel connection and may establish a BGP session between the new generated virtual route reflector and any other route reflectors associated with the customer.

In some implementations, different virtual route reflectors may be generated in different cloud centers. The VE system may receive an indication that another virtual route reflector has been generated for the customer in another cloud center and may, in response, establish a BGP session between the generated virtual route reflector and the other virtual route reflector over a connection between the cloud center access systems of the two different cloud centers.

Route reflectors as a service, generated in a VE system in a cloud center, may enable for a multi-tenant implementation (e.g., to serve a large number of different customers) and for large horizontal-scale capabilities. For example, the VE system may enable a customer to utilize hierarchical planes for organizing route reflectors. For example, a customer may select to cluster a first set of route reflectors into a first plane and a second set of route reflectors into a second plane and designate each set as client routers to a particular route reflector plane. Furthermore, route reflectors as a service may enable increased redundancy and/or resiliency. For example, a cloud center may include a web-scale architecture that includes a large pool of computational resources, memory, storage space, and/or network bandwidth. Therefore, a customer's networks and route reflector design may be easily scaled without additional purchases of routing hardware. Furthermore, failure or malfunction of a cloud center may be less likely than the failure of a dedicated router device.

Moreover, a virtualized environment with generated route reflectors may be easily duplicated and multiple connections between a client router and the cloud center access system may be maintained to improve robustness. Additionally or alternatively, the virtualized environment may be duplicated in another cloud center. Thus, using a route reflector service may enable a customer to increase redundancy and/or robustness.

Furthermore, the customer may not need to build and deploy a Multi-Protocol Label Switching (MPLS) backbone to exchange BGP information between the customer's routers. Rather, the customer may use the provider's MPLS backbone to send BGP information to the generated virtual route reflectors in the cloud center managed by the provider.

Further still, a customer may easily configure or upgrade a generated virtual route reflector provided as a service in a cloud center. As an example, the customer may send a request to configure the generated virtual route reflector to support different route reflector BGP address families, such as Internet Protocol version 4 (IPv4), IPv6, Virtual Private Network version 4 (VPNv4), VPNv6, Layer 2 VPN (L2VPN), multicast VPN (MVPN), Route Target (RT) constrained route distribution, and/or another type of addressing scheme.

FIG. 1 is a diagram of an exemplary environment 100 in which the systems and/or methods described herein may be implemented. As shown in FIG. 1, environment 100 may include customer networks 110-A to 110-X (referred to herein collectively as "customer networks 110" and individually as "customer network 110"), a provider network 120, and a cloud center system 140.

Customer network 110 may correspond to an AS associated with a customer of provider network 120. For example, customer network 110 may include an AS with a different IP prefix than provider network 120. A provider associated with provider network 120 may provide communication services to customer network 110 via provider network 120. For example, different customer networks 110 associated with a customer may communicate with each other using provider network 110 using, for example a Multi-Protocol Label Switching (MPLS) Virtual Private Network (VPN) implemented via provider network 120. In some implementations, the customer may correspond to a large enterprise that manages its own networks at multiple geographic locations, such as a large-scale financial institution or corporation. In other implementations, the customer may correspond to a regional or local provider of telecommunication services that provides telecommunication services, such as an Internet Service Provider (ISP), a provider of MPLS VPN services, a provider of television services, and/or a provider of voice communication for its customers. Customer network 110 may include one or more circuit-switched networks and/or packet-switched networks. Customer network 110 may include a local area network (LAN), a wide area network (WAN), a metropolitan area network (MAN), an ad hoc network, an intranet, the Internet, a fiber optic-based network, a wireless network, and/or any combination of these or other types of networks.

Customer network 110 may include provider edge (PE) routers 112-A to 112-N (e.g., customer network 110-A may include PE routers 112-A-A to 112-A-N, customer network 110-X may include PE routers 112-X-A to 112-X-N, etc.). Each PE router 112 may connect to a particular Layer 2 and/or Layer 3 network (not shown in FIG. 1) associated with the AS of customer network 110. Thus, PE router 112 may serve as an access point into customer network 110 for other networks services by customer network 110. Furthermore, customer network 110 may include a carrier supporting carrier (CSC) customer edge (CE) router 114 (e.g., customer network 110-A may include CSC-CE router 114-A, customer network 110-X may include CSC-CE router 114-X, etc.). CSC-CE routers 114 may connect to provider network 120.

Provider network 120 may correspond to an AS associated with a provider of communication services. Provider network 120 may include one or more circuit-switched networks and/or packet-switched networks. Provider network 120 may include a local area network (LAN), a wide area network (WAN), a metropolitan area network (MAN), an ad hoc network, an intranet, the Internet, a fiber optic-based network, a wireless network, and/or any combination of these or other types of networks. Provider network 120 may include CSC-PE routers 125-A to 125-X. Each CSC-PE router 125 may connect to a CSC-CE router 114 of a particular customer network 110.

Provider network 120 may function as a backbone carrier that provides connectivity to the customer carrier between customer networks 110 via the connections from CSC-CE 114s to CSC-PEs 125. Thus, for example, CSC-CE 114-A may perceive a direct connection to CSC-CE 114-X via CSC-PE 125-A and CSC-PE 125-X using an MPLS connection 130. Routes between customer networks 110 may be exchanged using BGP over MPLS connection 130 and provider network 120 may not be aware of, or learn, the routes between customer networks 110. Similarly, customer networks 110 may not learn or be aware of routes within provider network 110.

In order for all customer networks 110 to be able to communicate and exchange routes, each CSC-PE router 125 may need to maintain an IBGP session with every other CSC-PE router 125 or each CSC-PE router 125 may communicate with a particular route reflector as a client of the particular route reflector.

The provider associated with provider network 120 may provide route reflectors as a service implemented on virtualized environments in cloud center system 140. Cloud center system 140 may include a web-scale architecture that includes one or more server devices and/or storage devices, which provide cloud services for customers. Cloud services provided by cloud center system 140 may include, for example, computing as a service, cloud storage, a hosted voice-over-Internet Protocol (VoIP) service, a Network Address Translation (NAT) service, a Virtual Private Network (VPN) service, a Distributed Denial Of Service (DDOS) event detection and/or mitigation service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that be provided by a cloud center. Furthermore, cloud center system 140 may provide route reflectors as a service.

Cloud center system 140 may include a cloud center access system 145 and a virtualized environment (VE) system 150. Cloud center access system 145 may include one or more devices that connect cloud center system 140 to provider network 120. Devices in cloud center system 140 may connect to cloud center access system 145 with a Layer 2 connection or with a Layer 3 connection. For example, cloud center access system 145 may include one or more network devices that function as Layer 2 and/or Layer 3 devices and that maintain Layer 2 and/or Layer 3 separation for different customers. Layer 2 separation may correspond to maintaining Layer 2 traffic associated with a first customer separate from Layer 2 traffic associated with a second customer. Layer 2 separation may be accomplished by assigning particular Layer 2 Domains (L2D) to particular customers and tagging Layer 2 data units (e.g., Ethernet frames) with particular L2D tags. Layer 3 separation may correspond to maintaining Layer 3 traffic associated with a first customer separate from Layer 3 traffic associated with a second customer. Layer 3 separation may be accomplished by maintaining particular routing instances for particular customers. Each routing instance may include a separate routing table and traffic associated with a particular customer may be routed based on the routing table associated with the customer's routing instance.

VE system 150 may include one or more devices, such as server devices (e.g., an x86 server and/or other processing devices), that generate virtual route reflectors (RRs) 160 for customers (e.g., a customer associated with customer networks 110). For example, VE system 150 may generate a first virtual route reflector 160-A that includes CSC-PE 125-A as a client router and a second virtual route reflector 160-B that includes CSC-PE 125-X as a client router. In practice, a particular generated virtual route reflector 160 may interact with a large number of CSC-PEs 125 as client routers.

After VE system 150 generates a virtual route reflector 160, VE system 150 may establish a VPN or a secure tunnel connection 170 to each client router of the generated virtual route reflector 160. After the VPN or secure tunnel connection 170 is established, VE system 150 may establish an IBGP session 180 between the generated virtual route reflector 160 and each client router, as well between the generated virtual route reflector 160 and any other route reflectors associated with the customer. Virtual route reflector 160 may receive BGP route advertisements from customer networks 110. A BGP route advertisement may include routing and/or reachability information to a particular network, such as an indication of a new connection, an indication of a faulty or unavailable connection, an indication of a change in a BGP path attribute, and/or another type of routing/reachability information. For example, if PE router 112-A-A detects a new route, PE router 112-A-A may advertise the route to CSC-CE router 114-A, CSC-CE router 114-A may advertise the route to CSC-PE router 125-A, and CSC-PE router 125-A may advertise the route to virtual route reflector 160-A. RR 160-A may then advertise the route to all its client routers as well as to all other route reflectors associated with the customer (e.g., with the customer's VPN), such as virtual route reflector 160-B.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
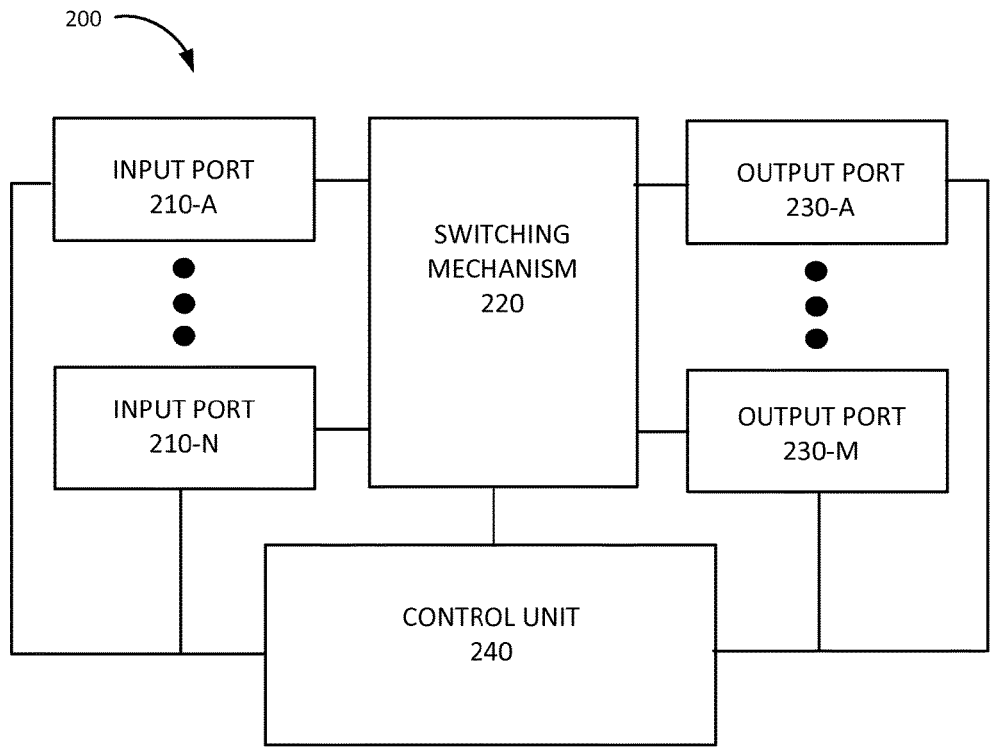
FIG. 2 is a diagram illustrating exemplary components of a router of the system of FIG. 1.

FIG. 2 is a diagram illustrating example components of a router device 200. Each of PE router 112, CSC-CE router 114, and/or CSC-PE router 125 may include one or more router devices 200. As shown in FIG. 2, router device 200 may include one or more input port or units 210-A to 210-N (referred to herein individually as "input port or unit 210" and collectively as "input port or units 210"), a switching mechanism 220, one or more output port or units 230-A to 230-M (referred to herein individually as "output port or unit 230" and collectively as "output port or units 230"), and/or a control unit 240.

Input port or units 210 may be the points of attachments for physical links and may be the points of entry for incoming traffic. An input port or unit 210 may be associated with an interface card. Input port or unit 210 may perform some or all of data plane processing associated with an incoming packet. Data plane processing may encompass looking up a destination address for an incoming packet, removing or changing a label associated with the packet, determining a path through switching mechanism 220, and/ or filter the packet based on one or more firewall filters.

Switching mechanism 220 may include one or more switching planes and/or fabric cards to facilitate communication between input port or units 210 and output port or units 230. In one implementation, each of the switching planes and/or fabric cards may include a single or multistage switch of crossbar elements. In another implementation, each of the switching planes may include some other form(s) of switching elements. Additionally or alternatively, switching mechanism 220 may include one or more processors, one or more memories, and/or one or more paths that permit communication between input port or units 210 and output port or units 230.

Output port or units 230 may store traffic received from input port or units 210 and may schedule the traffic on one or more output physical links. An output port or unit 230 may be associated with an interface card. Output port or unit 230 may perform some or all of data plane processing associated with an outgoing packet. For example, output port or unit 230 may classify the packet based on a quality of service class, schedule the packet in a particular queue, add or change a label associated with the packet, and/or filter the packet based on one or more firewall filters.

Control unit 240 may interconnect with input port or units 210, switching mechanism 220, and/or output port or units 230 and may control operation of router device 200. For example, control unit 240 may perform control plane operations associated with router device 200 (e.g., control unit 240 may use routing protocols and may create one or more routing tables and/or one or more forwarding tables that are used in traffic forwarding).

Although FIG. 2 shows example components of router device 200, in other implementations, router device 200 may include fewer components, different components, differently arranged components, and/or additional components than depicted in FIG. 2. Additionally or alternatively, one or more components of router device 200 may perform one or more tasks described as being performed by one or more other components of router device 200.

Figure 3:
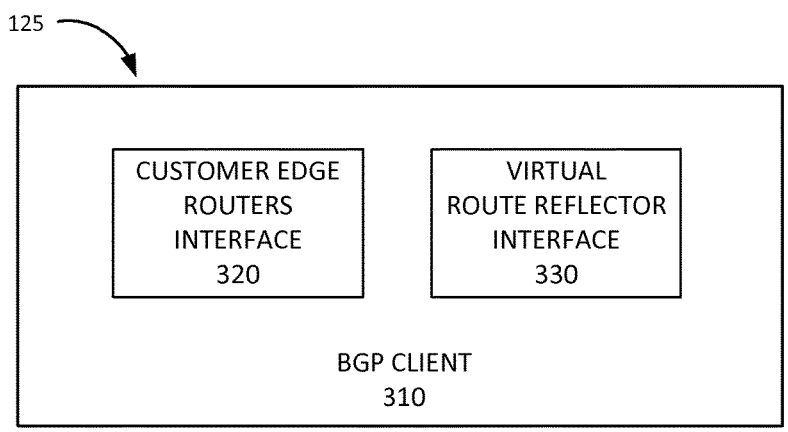
FIG. 3 is a diagram illustrating exemplary functional components of a router of the system of FIG. 1.

FIG. 3 is a diagram illustrating exemplary functional components of CSC-PE router 125. In some implementations, the functional components of CSC-PE router 125 may be implemented, for example, via control unit 240. Alternatively, some or all of the functional components of CSC-PE router 125 may be implemented via hard-wired circuitry. As shown in FIG. 3, CSC-PE router 125 may include a BGP client 310. BGP client 310 may manage BGP sessions with other routers. BGP client 310 may include customer edge routers interface 320 and virtual route reflector interface 330.

Customer edge routers interface 320 may manage BGP sessions with CSC-CE routers 114. For example, customer edge routers interface 320 may receive a BGP advertisement from PE routers 112 via CSC-CE router 114 and may provide the received BGP advertisement to virtual route reflector interface 330 to forward to virtual route reflector 160. Furthermore, customer edge routers interface 320 may receive a BGP advertisement from virtual route reflector 160 via virtual route reflector interface 330 and may forward the BGP route advertisement to CSC-CE router 114 and/or any other routers with which CSC-PE router 125 maintains BGP session (e.g., if CSC-PE router 125 is multi-homed).

Virtual route reflector interface 330 may manage a BGP session with virtual route reflector 160, or may manage multiple BGP sessions with multiple virtual route reflectors 160 for redundancy purposes. For example, virtual route reflector interface 330 may receive a BGP advertisement from virtual route reflector 160 and may provide the received BGP advertisement to customer edge routers interface 320 to forward to CSC-CE router 114. Furthermore, virtual route reflector interface 330 may receive a BGP advertisement from CSC-CE router 114 via customer edge routers interface 320 and may forward the BGP route advertisement to virtual route reflector 160, or to multiple virtual route reflectors 160 if multiple route reflectors are configured to communicate with CSC-PE router 125 for redundancy.

Although FIG. 3 shows exemplary functional components of CSC-PE router 125, in other implementations, CSC-PE router 125 may include fewer functional components, different functional components, differently arranged functional components, or additional functional components than those depicted in FIG. 3. Additionally or alternatively, one or more functional components of CSC-PE router 125 may perform functions described as being performed by one or more other functional components of CSC-PE router 125.

Figure 4:
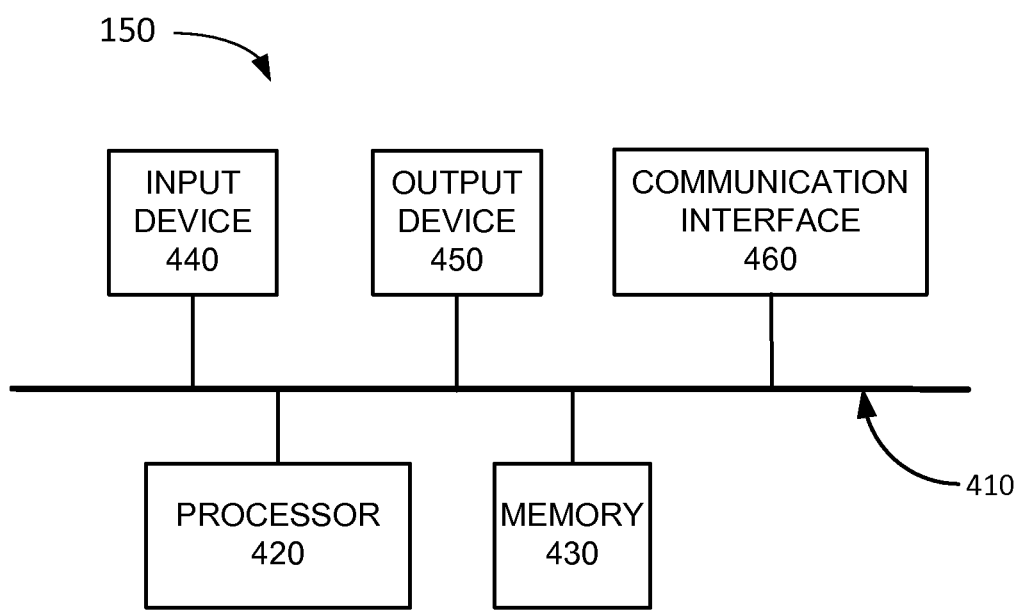
FIG. 4 is a diagram illustrating exemplary components of the virtualized environment system of FIG. 1.

FIG. 4 is a diagram illustrating exemplary components of VE system 150. As shown in FIG. 4, VE system 150 may include a bus 410, a processor 420, a memory 430, an input device 440, an output device 450, and a communication interface 460.

Bus 410 may include a path that permits communication among the components of VE system 150. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into VE system 150. Input device 440 may include, for example, a keyboard, a mouse, a pen, a microphone, a remote control, an audio capture device, an image and/or video capture device, a touch-screen display, and/or another type of input device. In some embodiments, VE system 150 may be managed remotely and may not include input device 440. In other words, VE system 150 may be "headless" and may not include a keyboard, for example.

Output device 450 may output information to an operator of VE system 150. Output device 450 may include a display, a printer, a speaker, and/or another type of output device. For example, VE system 150 may include a display, which may include a liquid-crystal display (LCD) for displaying content to the customer. In some embodiments, VE system 150 may be managed remotely and may not include output device 450. In other words, VE system 150 may be "headless" and may not include a display, for example.

Communication interface 460 may include a transceiver that enables VE system 150 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi)

card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, VE system 150 may perform certain operations relating to providing route reflectors as a service. VE system 150 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of VE system 150, in other implementations, VE system 150 may include fewer components, different components, additional components, or differently arranged components than those depicted in FIG. 4. Additionally or alternatively, one or more components of VE system 150 may perform one or more tasks described as being performed by one or more other components of VE system 150.

Figure 5:
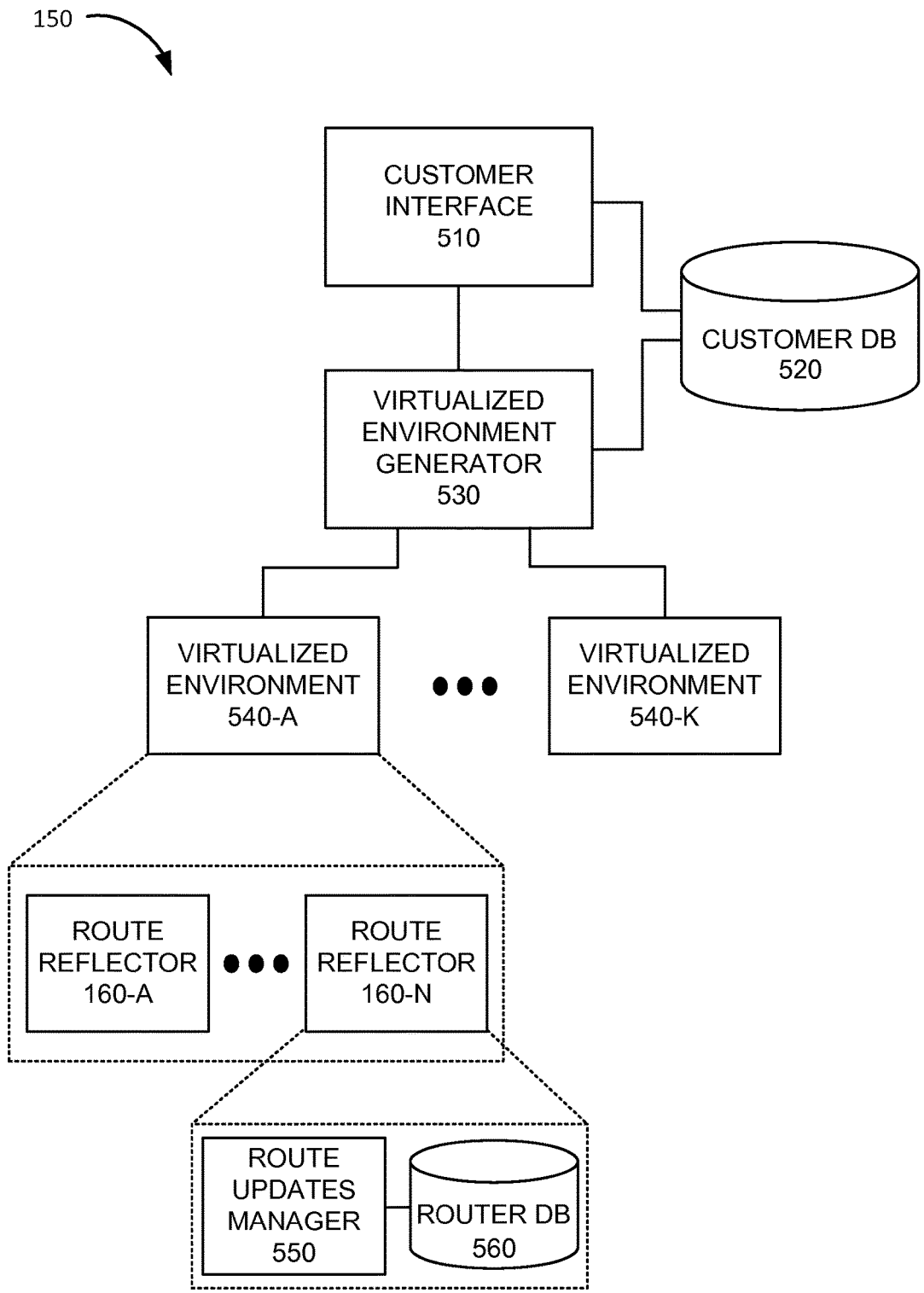
FIG. 5 is a diagram illustrating exemplary functional components of the virtualized environment system of FIG. 1.

FIG. 5 is a diagram illustrating exemplary functional components of VE system 150. In some implementations, the functional components of VE system 150 may be implemented, for example, via processor 420 executing instructions from memory 430. Alternatively, some or all of the functional components of VE system 150 may be implemented via hard-wired circuitry. As shown in FIG. 5, VE system 150 may include a customer interface 510, a customer database (DB) 520, a virtualized environment generator 530, and one or more virtualized environments 540-A to 540-M.

Customer interface 510 may be configured to receive requests from a customer to generate virtual route reflectors. For example, a customer may log into VE system 150 via customer interface 510 and be presented with a user interface to generate a new virtual route reflector. The user interface may request a customer to create an account and/or to log into an existing account. Furthermore, the user interface may enable the customer to specify a particular secure connection to use for establishing BGP sessions with particular client routers, to specify which CSC-PE routers 125 should be included in the client router set of the new virtual route reflector, and/or which other existing route reflectors should establish BGP sessions with the new virtual route reflector. Furthermore, the customer may request a particular redundancy (e.g., multiple BGP connections to client routers). Moreover, the user interface may enable the customer to request additional configuration options, such as a particular addressing scheme (e.g., IPv4, IPv6, VPNv4, VPNv6, L2VPN, MVPN, RT constrained route distribution, etc.). Customer interface 510 may obtain the information specified by the customer and may store the obtained information in customer DB 520.

Virtualized environment generator 530 may generate a virtualized environment 540 for the customer. A virtualized environment may be implemented with a virtual machine (VM), a Linux container, and/or another type of virtualized environment. Virtualized environment generator 530 may reserve processor and memory resources required to generate one or more virtual route reflectors and may load and operating system and/or software to simulate the operation of a route reflector device.

Thus, VE system 150 may include virtualized environments 540-A to 540-K. Each virtualized environment 540 may include route reflectors for a particular customer. Virtualized environment 540 may include one or more virtual route reflectors 160-A to 160-N. Each virtual route reflector 160 may function as a route reflector for a set of client routers associated with the customer (e.g., CSC-PE routers 125). As shown in FIG. 5, virtual route reflector 160 may include a route updates manager 550 and router DB 560.

Route updates manager 550 may perform the functions of a route reflector based on information stored in router DB 560. Exemplary information that may be stored in router DB 560 is described below with reference to FIG. 6. Route updates manager 550 may, for example, receive a BGP route advertisement from one if its client routers and may forward the BGP route advertisement to all its other client routers and all the other route reflectors with which the virtual route reflector 160 is maintaining a BGP session. Furthermore, route updates manager 550 may receive a BGP route advertisement from another route reflector and may forward the BGP advertisement to all its client routers. Route updates manager 550 may add IBGP distance metrics to router DB 560. Route updates manager 550 may obtain IBGP distance information through a BGP link state (BGP-LS) mechanism and/or using another technique.

Although FIG. 5 shows exemplary functional components of VE system 150, in other implementations, VE system 150 may include fewer functional components, different functional components, differently arranged functional components, or additional functional components than those depicted in FIG. 5. Additionally or alternatively, one or more functional components of VE system 150 may perform functions described as being performed by one or more other functional components of VE system 150.

Figure 6:
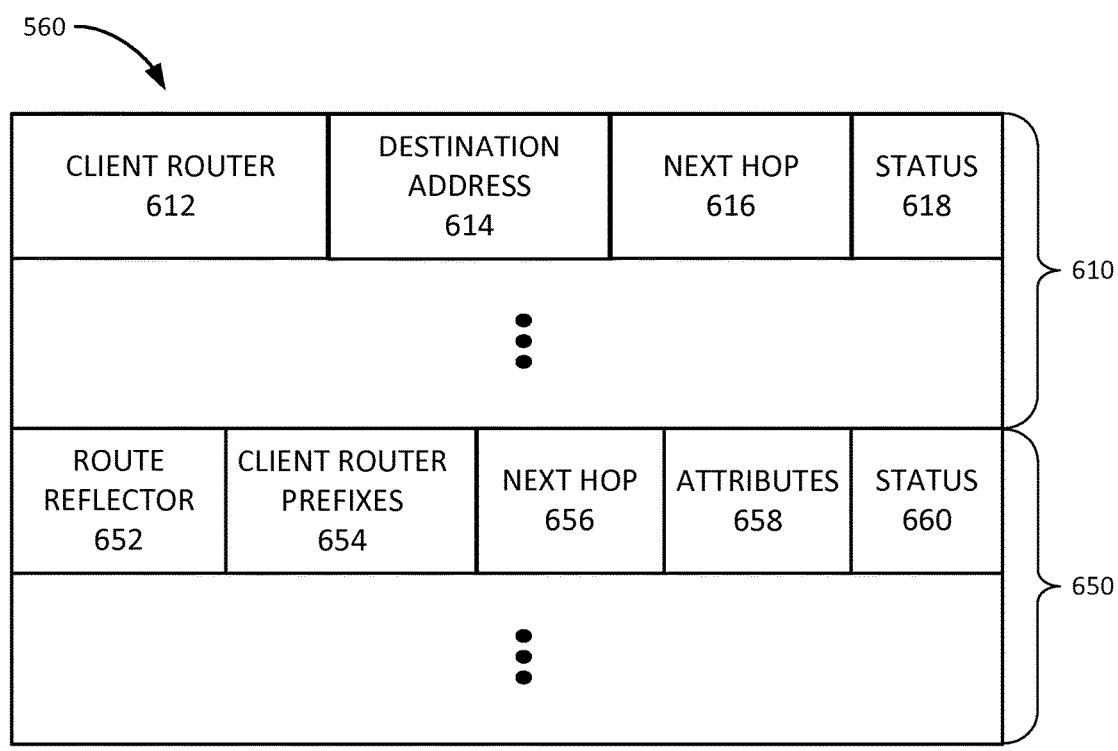
FIG. 6 is a diagram illustrating exemplary information that may be stored in the router database of FIG. 5.

FIG. 6 is a diagram illustrating exemplary information that may be stored in the router DB 560. As shown in FIG. 6, router DB 560 may include one or more client router records 610 and one or more route reflector records 650. Each client router record 610 may store information relating to a particular client router associated with the generated virtual route reflector 160. Client router record 610 may include a client router field 612, a destination address field 614, a next hop field 616, and a status field 618.

Client router field 612 may identify a particular client router that is a member of the client router set of virtual route reflector 160. Destination address field 614 may store an address associated with the particular client router (e.g., the IP address of the particular client router). Next hop field 616 may store one or more next hop addresses associated with the particular client router. Status field 618 may store a status associated with the particular client router, such as whether the particular client router is active, disabled, offline, and/or whether the connection to the particular client router is up or down.

Each route reflector record 650 may store information relating to another route reflector 160 associated with the customer. Route reflector record 650 may include a route reflector field 652, a client router prefixes field 654, a next hop field 656, an attributes field 658, and a status field 660.

Route reflector field 652 may identify a particular route reflector associated with the customer. The particular route reflector may include a physical route reflector maintained by the customer, a virtual route reflector simulated on a same cloud center system 140, or a virtual route reflector simulated on a different cloud center system 140. Client router prefixes field 654 may store the address prefixes (e.g., IP address prefixes) associated with the client routers of the particular route reflector. Next hop field 656 may store next hop addresses associated with the client routers of the particular route reflector. Attributes field 658 may store one or more attributes associated with the particular route reflector. The attributes may be used to avoid routing loops. Status field 660 may store a status associated with the particular route reflector, such as whether the particular route reflector is active, disabled, offline, and/or whether the connection to the particular route reflector is up or down.

Although FIG. 6 shows exemplary fields of router DB 560, in other implementations, router DB 560 may include fewer fields, different fields, differently arranged fields, or additional fields than those depicted in FIG. 6.

Figure 7:
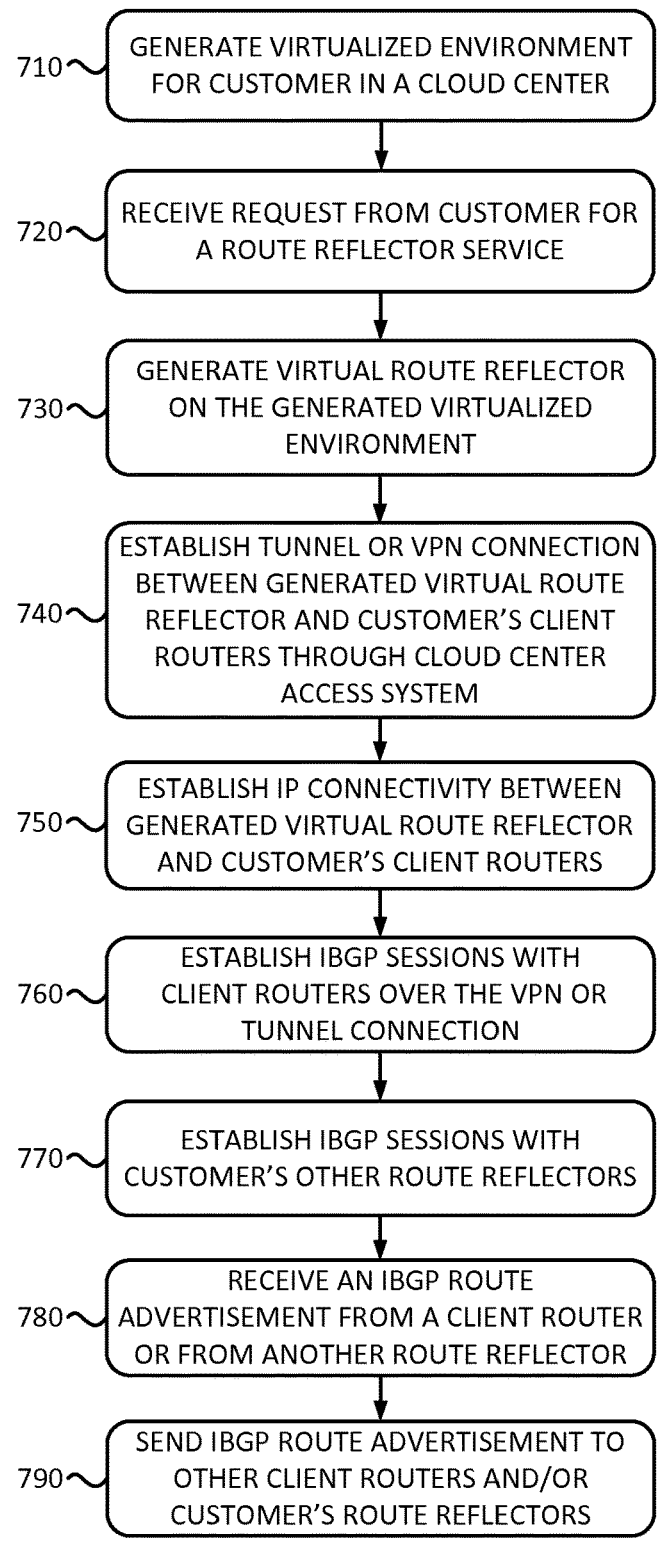
FIG. 7 is a flowchart of an exemplary process for providing a route reflector service according to an implementation described herein.

FIG. 7 is a flowchart of an exemplary process for providing a route reflector service according to an implementation described herein. In some implementations, the process of FIG. 7 may be performed by VE system 150. In other implementations, some or all of the process of FIG. 7 may be performed by another device or a group of devices separate from or including VE system 150. Furthermore, in other implementations, the process of FIG. 7 may include fewer blocks, additional blocks, different blocks, or differently arranged blocks.

The process of FIG. 7 may include generating a virtualized environment for a customer in a cloud center (block 710), receiving a request from the customer for a route reflector service (block 720), and generating a virtual route reflector on the generated virtualized environment (block 730). For example, virtualized environment generator 530 may generate virtualized environment 540 for the customer when the customer creates an account using customer interface 510. The user may then use the customer interface 510 to request generation of a virtual route reflector. The customer may specify a particular secure connection to use for establishing BGP sessions with particular client routers, may specify which CSC-PE routers 125 should be included in the client router set of the new virtual route reflector, and/or may specify which other existing route reflectors should establish BGP sessions with the new virtual route reflector. Furthermore, the customer may request a particular redundancy (e.g., multiple BGP connections to client routers), and/or may request additional configuration options, such as a particular addressing scheme, etc. Customer interface 510 may obtain the information specified by the customer and may store the obtained information in customer DB 520. Virtualized environment generator 530 may generate virtual route reflector 160 on the generated virtualized environment 540 based on the customer's provided specifications.

A secure tunnel or VPN connection may be established between the generated virtual route reflector and the customer's client routers through the cloud center access system (block 740). For example, virtualized environment generator 530 may join a VPN associated with the customer and may configure the VRF in cloud center access system 145 to route packets labeled with VPN tags associated with the VPN to virtual route reflector 160. As customer's CSC-PE routers 125 may already be a member of the customer's VPN, virtualized environment generator 530 may not need to configure the client routers to establish VPN communication between the client routers and virtual route reflector 160. As another example, virtualized environment generator 530 may generate a secure tunnel between each of the client routers and virtual route reflector 160. For example, virtualized environment generator 530 may generate a secure tunnel tag as well as authentication information for the secure tunnel tag (e.g., a public and private key) and may configure both the VRF in cloud center access system 145 and the client CSC-PE routers 125 to add the secure tunnel tag and the authentication information when communicating. In other implementations, the tunnel need not be secure. Examples of tunnels that may be used include an MPLS transport tunnel, a Generic Routing Encapsulation (GRE) tunnel, an Internet Protocol Security (IPSec) tunnel, and/or another type of tunnel.

IP connectivity may be established between the generated virtual route reflector and the customer's client routers (block 750). For example, the customer's CSC-PE routers 125 may already be configured and be part of provider network 120. Thus, the customer's CSC-PE routers 125 may have assigned IP addresses in provider network 120. Virtualized environment generator 530 may assign an IP address to the generated virtual router 160. Furthermore, virtualized environment generator 530 may configure Layer 3 separation for the generated virtual router 160 at cloud center access system 145 by, for example, generating a Virtual Routing and Forwarding (VRF) table for the generated virtual router 160.

IBGP sessions may be established with the client routers over the VPN or tunnel connection (block 760) and IBGP sessions may be established with the customer's other route reflectors (block 770). For example, route reflector 160 may establish an IBGP session with each client router designated in router DB 560 as well as with each route reflector designated in router DB 560. After IBGP sessions are established, virtual route reflector 160 may begin receiving and forwarding BGP route advertisements exchanged between customer networks 110.

An IBGP route advertisement may be received from a client router or another route reflector (block 780) and the IBGP route advertisement may be sent to other client routers and/or the customer's other route reflectors (block 790). As an example, virtual route reflector 160 may receive an IBGP route advertisement from one of its client routers and may send the IBGP route advertisement to all its other client routers as well all other route reflectors associated with the customer. As another example, virtual route reflector 160 may receive an IBGP route advertisement from another route reflector and may send the IBGP route advertisement to all its client routers. Virtual route reflector 160 need not forward an IBGP route advertisement to other route reflectors, since all other route reflectors will also receive the IBGP route advertisement from the sending route reflector.

Figure 8:
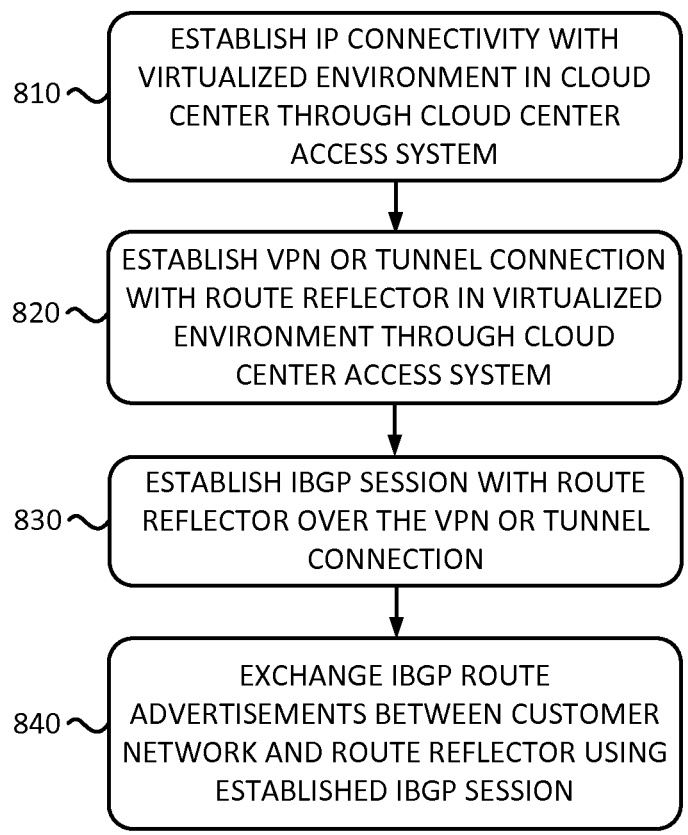
FIG. 8 is a flowchart of an exemplary process performed by a carrier supporting carrier provider edge router according to an implementation described herein.

FIG. 8 is a flowchart of an exemplary process performed by a carrier supporting carrier provider edge router according to an implementation described herein. In some implementations, the process of FIG. 8 may be performed by CSC-PE router 125. In other implementations, some or all of the process of FIG. 8 may be performed by another device or a group of devices separate from or including CSC-PE router 125. Furthermore, in other implementations, the process of FIG. 8 may include fewer blocks, additional blocks, different blocks, or differently arranged blocks.

The process of FIG. 8 may include establishing IP connectivity with a virtualized environment in a cloud center through a cloud center access system (block 810), establishing a VPN or tunnel connection with a route reflector in the virtualized environment through the cloud center access system (block 820), and establishing an IBGP session with the route reflector over the VPN or tunnel connection (block 830). For example, virtualized environment generator 530 may advertise the IP address of virtual route reflector 160 as reachable via cloud center access system 145 to CSC-PE router 125 and may establish a VPN or tunnel connection to virtual route reflector 160 from CSC-PE router 125 via cloud center access system 145. For example, virtualized environment generator 530 may join a VPN associated with CSC-PE router 125 and may configure the VRF in cloud center access system 145 to route packets labeled with VPN tags associated with the VPN to virtual route reflector 160. As another example, virtualized environment generator 530 may generate an MPLS tunnel, a GRE tunnel, an IPsec tunnel, and/or another type of tunnel between CSC-PE router 125 and virtual route reflector 160.

IBGP route advertisements may be exchanged between the customer network and the route reflector using the established IBGP session (block 840). As an example, CSC-PE router 125 may receive an IBGP advertisement from PE routers 112 via CSC-CE router 114 and may provide the received BGP advertisement to virtual route reflector 160. As another example, CSC-PE router 125 may receive an IBGP advertisement from virtual route reflector 160 and may forward the BGP route advertisement to CSC-CE router 114 and/or any other routers with which CSC-PE router 125 maintains BGP session (e.g., if CSC-PE router 125 is multi-homed).

Figure 9:
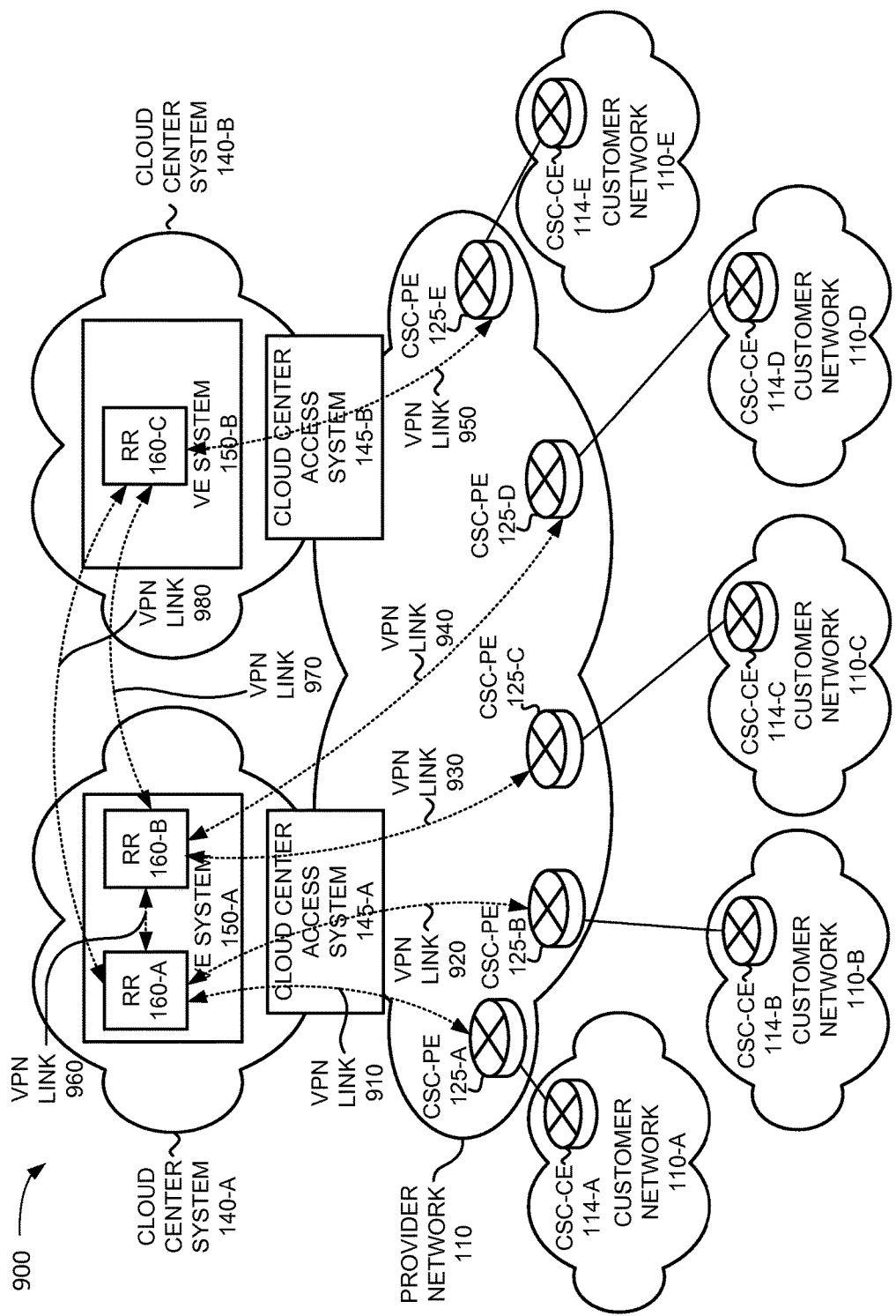
FIG. 9 is a diagram of an exemplary scenario according to an implementation described herein.

FIG. 9 is a diagram of a first exemplary scenario 900 according to an implementation described herein. In scenario 900, the customer may manage five customer networks 110: customer network 110-A that includes CSC-CE router 114-A communicating with CSC-PE 125-A in provider network 110; customer network 110-B that includes CSC-CE router 114-B communicating with CSC-PE 125-B in provider network 110; customer network 110-C that includes CSC-CE router 114-C communicating with CSC-PE 125-C in provider network 110; customer network 110-D that includes CSC-CE router 114-D communicating with CSC-PE 125-D in provider network 110; and customer network 110-E that includes CSC-CE router 114-E communicating with CSC-PE 125-E in provider network 110. Furthermore, scenario 900 may include cloud center system 140-A and cloud center system 140-B.

Assume that customer network 110-E is geographically separated from the other customer networks. The customer may request a first virtual route reflector 160-A with a client router set of CSC-PE 125-A and CSC-PE 125-B, a second virtual route reflector 160-B with a client router set of CSC-PE 125-C and CSC-PE 125-D, and a third virtual route reflector 160-C with a client router set of CSC-PE 125-E. First and second virtual route reflectors 160-A and 160-B may be generated in cloud center system 140-A. Because of the geographic separation, third virtual route reflector 160-C may be generated in cloud center system 140-B, which may be geographically closer to customer network 110-E than cloud center system 140-A.

The three generated virtual route reflectors 160-A, 160-B, and 160-C may join the customer's VPN. Thus, a first VPN link 910 may be established between CSC-PE router 125-A and virtual route reflector 160-A; a second VPN link 920 may be established between CSC-PE router 125-B and virtual route reflector 160-A; a third VPN link 930 may be established between CSC-PE router 125-C and virtual route reflector 160-B; a fourth VPN link 940 may be established between CSC-PE router 125-D and virtual route reflector 160-B; and a fifth VPN link 950 may be established between CSC-PE router 125-E and virtual route reflector 160-C.

Furthermore, VPN links between the virtual route reflectors 160 may be established. Thus, a sixth VPN link 960 may be established between route reflector 160-A and route reflector 160-B; a seventh VPN link 970 may be established between route reflector 160-B and route reflector 160-C; and an eighth VPN link 980 may be established between route reflector 160-A. and route reflector 160-C. IBGP sessions (not shown in FIG. 9) may then be established over the established VPN links.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   generating, by the computer device, a virtualized environment for a customer in a cloud center system, wherein the cloud center system includes a plurality of virtualized environments, and wherein a particular one of the plurality of virtualized environments includes virtual route reflectors for a particular one of a plurality of customers;
   receiving, by the computer device, a request to provide a route reflector service for the customer via a customer interface;
   receiving, by the computer device, one or more configuration specifications for the requested route reflector service via the customer interface;
   generating, by the computer device, a virtual route reflector on the generated virtualized environment based on the received one or more configuration specifications, in response to receiving the request to provide the route reflector service for the customer;
   establishing, by the computer device, a Virtual Private Network (VPN) or secure tunnel connection between the generated virtual route reflector and a client router associated with a customer network via a cloud center access system, wherein the cloud center access system connects the cloud center system to a provider network that includes the client router, and wherein the cloud center access system maintains traffic separation for the plurality of customers; and
   establishing, by the computer device, a Border Gateway Protocol (BGP) session between the client router and the generated virtual route reflector using the established VPN or secure tunnel connection.

2. The method of claim 1, wherein establishing the VPN or secure tunnel connection between the generated virtual route reflector and the client router associated with the customer network via the cloud center access system includes:
   adding the generated virtual route reflector to the VPN associated with the customer network.

3. The method of claim 1, wherein establishing the VPN or secure tunnel connection between the generated virtual route reflector and the client router associated with the customer network via the cloud center access system includes:
   generating a secure tunnel between the client router and the generated virtual route reflector via the cloud center access system.

4. The method of claim 1, wherein the client router associated with the customer network includes a carrier supporting carrier (CSC) provider edge (PE) router in the provider network, wherein the CSC PE router communicates with a CSC customer edge (CE) router in the customer network, and wherein the provider network functions as a backbone carrier to a customer carrier associated with the CSC PE router and the CSC CE router.

5. The method of claim 1, further comprising:
   receiving a request from the customer to add another router as a client router of the generated virtual route reflector;
   establishing another VPN or secure tunnel connection between the generated virtual route reflector and the other client router via the cloud center access system; and
   establishing another BGP session between the other client router and the generated virtual route reflector using the established other VPN or secure tunnel connection.

6. The method of claim 1, further comprising:
   receiving a BGP route advertisement from the client router;
   forwarding the BGP route advertisement to other client routers associated with the generated virtual route reflector; and
   forwarding the BGP route advertisement to other route reflectors associated with the generated virtual route reflector.

7. The method of claim 1, further comprising:
   receiving a request from the customer to generate another virtual route reflector;
   generating the other virtual route reflector, in response to receiving the request from the customer to generate the other virtual route reflector;
   establishing another VPN or secure tunnel connection between the generated other virtual route reflector and at least one other client router via the cloud center access system;
   establishing a second BGP session between the at least one other client router and the generated other virtual route reflector using the established other VPN or secure tunnel connection; and
   establishing a third BGP session between the generated virtual route reflector and the generated other virtual route reflector.

8. The method of claim 1, further comprising:
   receiving an indication that another virtual route reflector has been generated for the customer in another cloud center system; and
   establishing another BGP session between the generated virtual route reflector and the other virtual route reflector over a connection between the cloud center access system and another cloud center access system associated with the other cloud center system.

9. The method of claim 1, wherein the cloud center access system performs Layer 3 separation for traffic associated with the plurality of customers.

10. The method of claim 1, wherein the generated virtual route reflector includes a routing database that identifies a plurality of client routers associated with the virtual route reflector.

11. A computer device comprising:
    logic configured to:
      generate a virtualized environment for a customer in a cloud center system, wherein the cloud center system includes a plurality of virtualized environments, and wherein a particular one of the plurality of virtualized environments includes virtual route reflectors for a particular one of a plurality of customers;
      receive a request to provide a route reflector service for the customer via a customer interface;
      receive one or more configuration specifications for the requested route reflector service via the customer interface;
      generate a virtual route reflector on the generated virtualized environment based on the received one or more configuration specifications, in response to receiving the request to provide the route reflector service for the customer;

establish a Virtual Private Network (VPN) or secure tunnel connection between the generated virtual route reflector and a client router associated with a customer network via a cloud center access system, wherein the cloud center access system connects the cloud center system that includes the computer device to a provider network that includes the client router, and wherein the cloud center access system maintains traffic separation for the plurality of customers; and establish a Border Gateway Protocol (BGP) session between the client router and the generated virtual route reflector using the established VPN or secure tunnel connection.

12. The computer device of claim 11, wherein when establishing the VPN or secure tunnel connection between the generated virtual route reflector and the client router associated with the customer network via the cloud center access system, the logic is further configured to:
add the generated virtual route reflector to the VPN associated with the customer network.

13. The computer device of claim 11, wherein when establishing the VPN or secure tunnel connection between the generated virtual route reflector and the client router associated with the customer network via the cloud center access system, the logic is further configured to:
generate a secure tunnel between the client router and the generated virtual route reflector via the cloud center access system.

14. The computer device of claim 11, wherein the client router associated with the customer network includes a carrier supporting carrier (CSC) provider edge (PE) router in the provider network, wherein the CSC PE router communicates with a CSC customer edge (CE) router in the customer network, and wherein the provider network functions as a backbone carrier to a customer carrier associated with the CSC PE router and the CSC CE router.

15. The computer device of claim 11, wherein the logic is further configured to:
receive a request from the customer to add another router as a client router of the generated virtual route reflector;
establish another VPN or secure tunnel connection between the generated virtual route reflector and the other client router via the cloud center access system; and
establish another BGP session between the other client router and the generated virtual route reflector using the established other VPN or secure tunnel connection.

16. The computer device of claim 11, wherein the logic is further configured to:
receive a BGP route advertisement from the client router;
forward the BGP route advertisement to other client routers associated with the generated virtual route reflector; and
forward the BGP route advertisement to other route reflectors associated with the generated virtual route reflector.

17. The computer device of claim 11, wherein the logic is further configured to:
receive a request from the customer to generate another virtual route reflector;
generate the other virtual route reflector, in response to receiving the request from the customer to generate the other virtual route reflector;

establish another VPN or secure tunnel connection between the generated other virtual route reflector and at least one other client router via the cloud center access system;
establish a second BGP session between the at least one other client router and the generated other virtual route reflector using the established other VPN or secure tunnel connection; and
establish a third BGP session between the generated virtual route reflector and the generated other virtual route reflector.

18. The computer device of claim 11, wherein the logic is further configured to:
receive an indication that another virtual route reflector has been generated for the customer in another cloud center system; and
establish another BGP session between the generated virtual route reflector and the other virtual route reflector over a connection between the cloud center access system and another cloud center access system associated with the other cloud center system.

19. A non-transitory computer-readable memory device storing instructions executable by a processor, the non-transitory computer-readable memory device comprising:
one or more instructions to generate a virtualized environment for a customer in a cloud center system, wherein the cloud center system includes a plurality of virtualized environments, and wherein a particular one of the plurality of virtualized environments includes virtual route reflectors for a particular one of a plurality of customers;
one or more instructions to receive a request to provide a route reflector service for the customer via a customer interface;
one or more instructions to receive one or more configuration specifications for the requested route reflector service via the customer interface;
one or more instructions to generate a virtual route reflector on the generated virtualized environment based on the received one or more configuration specifications, in response to receiving the request to provide the route reflector service for the customer;
one or more instructions to establish a Virtual Private Network (VPN) or secure tunnel connection between the generated virtual route reflector and a client router associated with a customer network via a cloud center access system, wherein the cloud center access system connects the cloud center system that includes the computer device to a provider network that includes the client router, and wherein the cloud center access system maintains traffic separation for the plurality of customers; and
one or more instructions to establish a Border Gateway Protocol (BGP) session between the client router and the generated virtual route reflector using the established VPN or secure tunnel connection.

20. The non-transitory computer-readable memory device of claim 19, further comprising:
one or more instructions to receive a request from the customer to generate another virtual route reflector;
one or more instructions to generate the other virtual route reflector, in response to receiving the request from the customer to generate the other virtual route reflector;
one or more instructions to establish another VPN or secure tunnel connection between the generated other virtual route reflector and at least one other client router via the cloud center access system;

one or more instructions to establish a second BGP session between the at least one other client router and the generated other virtual route reflector using the established other VPN or secure tunnel connection; and one or more instructions to establish a third BGP session between the generated virtual route reflector and the generated other virtual route reflector.

* * * * *